US011279319B2

(12) United States Patent
Carney Landow

(10) Patent No.: US 11,279,319 B2
(45) Date of Patent: *Mar. 22, 2022

(54) SYSTEMS AND METHODS FOR IDENTIFYING UNAUTHORIZED VEHICLE USE

(71) Applicant: DISH Network L.L.C., Englewood, CO (US)

(72) Inventor: Kate Megan Carney Landow, Denver, CO (US)

(73) Assignee: DISH Network L.L.C., Englewood, CO (US)

(*) Notice: Subject to any disclaimer, the term of this patent is extended or adjusted under 35 U.S.C. 154(b) by 142 days.

This patent is subject to a terminal disclaimer.

(21) Appl. No.: 16/717,750

(22) Filed: Dec. 17, 2019

(65) Prior Publication Data

US 2020/0139930 A1 May 7, 2020

Related U.S. Application Data

(63) Continuation of application No. 16/151,944, filed on Oct. 4, 2018, now Pat. No. 10,543,809.

(51) Int. Cl.
*B60R 25/102* (2013.01)
*G08G 1/00* (2006.01)
*B60R 25/30* (2013.01)
*G08G 1/01* (2006.01)

(52) U.S. Cl.
CPC .......... *B60R 25/102* (2013.01); *B60R 25/30* (2013.01); *G08G 1/012* (2013.01); *G08G 1/207* (2013.01); *B60R 2325/106* (2013.01)

(58) Field of Classification Search
CPC . B60R 25/30; B60R 2325/106; B60R 25/102; G08G 1/012; G08G 1/207
USPC ....................................... 340/426.1
See application file for complete search history.

(56) References Cited

U.S. PATENT DOCUMENTS

| 10,255,809 | B1* | 4/2019 | Ledet ................ G08G 1/147 |
| 2002/0109408 | A1 | 8/2002 | Ries-Mueller |
| 2006/0244577 | A1 | 11/2006 | Tanaka |
| 2011/0099126 | A1* | 4/2011 | Belani ................ G08G 1/14 705/418 |
| 2011/0218940 | A1* | 9/2011 | Bergstrom ........... G07B 15/02 705/418 |
| 2015/0138001 | A1 | 5/2015 | Davies |
| 2017/0080897 | A1* | 3/2017 | Nordbruch ........... G08G 1/207 |
| 2017/0098374 | A1* | 4/2017 | Sullivan ............... H04W 4/44 |
| 2017/0124395 | A1* | 5/2017 | Cohen ................. G08G 1/142 |
| 2017/0140645 | A1* | 5/2017 | Balid .................... H04W 4/40 |
| 2017/0142023 | A1* | 5/2017 | Yadav ................. G06F 9/5011 |
| 2017/0270490 | A1 | 9/2017 | Penilla |

(Continued)

*Primary Examiner* — Jack K Wang

(74) *Attorney, Agent, or Firm* — Kilpatrick Townsend & Stockton LLP

(57) ABSTRACT

Various arrangements for monitoring the unauthorized use of a vehicle are presented. An in-space parking sensor may be used to detect whether a vehicle is present. Data may be obtained indicating that a particular vehicle parking in the parking space that has the in-space parking sensor. A vehicle departure from the parking space may be detected. A determination may be made that departure of the particular vehicle has occurred during the time period. A notification may be output based on determining that the vehicle departure has occurred.

20 Claims, 6 Drawing Sheets

(56) References Cited

U.S. PATENT DOCUMENTS

2018/0342158 A1 11/2018 Carannante
2020/0250896 A1* 8/2020 Vossoughi ............. G07B 15/04

* cited by examiner

SYSTEMS AND METHODS FOR IDENTIFYING UNAUTHORIZED VEHICLE USE

CROSS-REFERENCES TO RELATED APPLICATIONS

This application is a continuation of U.S. patent application Ser. No. 16/151,944, filed on Oct. 4, 2018, entitled "Systems and Methods for Identifying Unauthorized Vehicle Use," the disclosure of which is hereby incorporated by reference in its entirety for all purposes.

BACKGROUND

Vehicle theft remains a problem throughout the world. Particularly, a company's fleet vehicles tend to be filled with expensive equipment that can be stripped and resold on the black market. Additionally or alternatively, the vehicles themselves may have significant value. Many persons and companies rely on primitive means for maintaining security of their vehicles, such as by keeping the vehicle within a fenced in area or relying on the vehicle's own locking mechanisms. However, when such mechanisms are defeated and a vehicle is stolen, it may be several hours or even days before the vehicle is discovered to have been taken, by which time the vehicle and/or its equipment may be less likely to be recoverable.

SUMMARY

Various embodiments are described related to a system for monitoring unauthorized use of a vehicle. In some embodiments, a system for monitoring unauthorized use of a vehicle is described. The system may include an in-space parking sensor device. The device may include a housing configured to be placed in a parking space. The device may include a radio transceiver housed by the housing. The device may include a vehicle sensor, housed by the housing, for detecting a presence of the vehicle within the parking space. The device may include one or more processors that are in communication with the radio transceiver and the vehicle sensor. The one or more processors may be configured to analyze sensor data received from the vehicle sensor to determine whether the vehicle may be parked within the parking space. The one or more processors may be configured to transmit, to a cloud-based server system, parking data indicative of a vehicle departure of the vehicle from the parking space based on the analyzed sensor data. The cloud-based server system may be configured to receive an indication of a time period during which the vehicle may be expected to be within the parking space. The system may be configured to receive, from the in-space parking sensor device, the parking data indicative of the vehicle having departed the parking space. The system may be configured to determine, based on the parking data and the time period, that the vehicle departure may be unauthorized due to the vehicle departure occurring during the time period. The system may be configured to output an alarm indication based on determining that the vehicle departure may be unauthorized.

Embodiments of a such a system may include one or more of the following features: The data indicative of the vehicle departure may include a parking sensor device identifier and the cloud-based server system may be further configured to determine the parking space from which the vehicle departure occurred based at least in part on the parking sensor device identifier. The alarm indication may indicate the parking space. The data indicative of the vehicle departure may include a parking sensor device identifier and the cloud-based server system may be further configured to access a vehicle database that maps a plurality of vehicles to a plurality of parking space identifiers. The cloud-based server system may determine the vehicle identifier of the vehicle using a parking space identifier and the vehicle database. The alarm indication may indicate the vehicle identifier. The cloud-based server system may be further configured to receive registration data that maps the vehicle identifier to the parking space identifier. The system may further include an in-vehicle wireless communication device configured to receive a request from the in-space parking sensor device. The in-vehicle wireless communication device may be configured to, in response to the request, transmit a vehicle identifier to the in-space parking sensor device. The transmitted parking data may include the vehicle identifier. The alarm indication may include the vehicle identifier. The system may include an in-vehicle wireless communication device configured to receive a parking space identifier from the in-space parking sensor device. The device may be configured to transmit a vehicle identifier and the parking space identifier to the cloud-based server system. The alarm indication may include the vehicle identifier. The system may include a communication gateway. The communication gateway may include a local wireless communication interface that communicates wirelessly with a plurality of in-space parking sensor devices that may include the in-space parking sensor device. The communication gateway may include a wide-area communication interface that communicates with the cloud-based server system via the Internet. The wide-area communication interface may communicate using a narrow-band internet of things (NB-IoT) network. The cloud-based server system may be further configured to transmit a notification of the vehicle departure to a driver mobile device mapped to the vehicle based on determining that the vehicle departure may be unauthorized. The system may be further configured to receive an unauthorized departure response in response to the notification. The alarm indication being transmitted may be further based on the received unauthorized departure response. The vehicle sensor of the in-space parking sensor device may be a magnetometer.

In some embodiments, a method for monitoring unauthorized use of a vehicle is described. The method may include receiving, by a cloud-based server system, an indication of a time period during which the vehicle may be expected to be within a parking space. The method may include capturing, using a parking sensor that may be located within the parking space, sensor data indicative of whether the vehicle may be parked within a parking space. The method may include determining, based on the sensor data obtained from the parking sensor, that a vehicle departure from the parking space has occurred. The method may include determining, by the cloud-based server system, that the vehicle departure may be unauthorized due to the vehicle departure occurring during the time period. The method may include outputting, by the cloud-based server system, an alarm indication based on determining that the vehicle departure may be unauthorized.

Embodiments of such a method may include one or more of the following features: The method may include receiving, by the cloud-based server system, the sensor data. The sensor data may include a parking sensor device identifier. The sensor data may include determining, by the cloud-based server system, the parking space from which the vehicle departure occurred based at least in part on the parking sensor device identifier. The alarm indication may indicate the parking space. The method may further include accessing, by the cloud-based server system, a vehicle database that maps a plurality of vehicles to a plurality of parking space identifiers. The method may further include determining, by the cloud-based server system, a vehicle identifier of the vehicle using the parking space identifier and the vehicle database. The alarm indication may indicate the vehicle identifier. The method may further include receiving, by the cloud-based server system, registration data that maps the vehicle identifier to the parking space identifier. The method may further include receiving, by an in-vehicle wireless communication device, a request from an in-space parking sensor device. The method may further include, in response to the request, transmitting, by the in-vehicle wireless communication device, a vehicle identifier to the in-space parking sensor device. The transmitted parking data may include the vehicle identifier. The alarm indication may include the vehicle identifier. The method may include transmitting, by the cloud-based server system, a notification of the vehicle departure to a driver mobile device mapped to the vehicle based on determining that the vehicle departure may be unauthorized. The method may include receiving, by the cloud-based server system, an unauthorized departure response in response to the notification. The alarm indication being transmitted may be further based on the received unauthorized departure response.

In some embodiments, a non-transitory processor-readable medium is described. The medium may include processor-readable instructions configured to cause one or more processors to perform various tasks, such as causing the one or more processors to receive an indication of a time period during which a vehicle may be expected to be within a parking space. The one or more processors may receive sensor data from a parking sensor. The one or more processors may analyze the sensor data to determine whether the vehicle may be parked within a parking space. The one or more processors may determine, based on the sensor data, that a vehicle departure from the parking space has occurred by the vehicle. The one or more processors may determine that the vehicle departure may be unauthorized due to the vehicle departure occurring during the time period. The one or more processors may output an alarm indication based on determining that the vehicle departure may be unauthorized. The processor-readable instructions may be further configured to receive a parking sensor device identifier with the sensor data. The processor-readable instructions may be further configured to determine the parking space from which the vehicle departure occurred based at least in part on the parking sensor device identifier. The alarm indication may indicate the parking space. The processor-readable instructions may be further configured to access a vehicle database that maps a plurality of vehicles to a plurality of parking space identifiers. The processor-readable instructions may be further configured to determine a vehicle identifier of the vehicle using the parking space identifier and the vehicle database. The alarm indication may indicate the vehicle identifier. The processor-readable instructions may be further configured to cause a notification of the vehicle departure to be transmitted to a driver mobile device mapped to the vehicle based on determining that the vehicle departure may be unauthorized. The processor-readable instructions may be further configured to process an unauthorized departure response received in response to the notification. The alarm indication being transmitted may be further based on the received unauthorized departure response.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

When a vehicle is stolen, a significant amount of time may elapse between when the theft occurred and an owner or authorized user of the vehicle has noticed. Rather than waiting for someone to notice the theft, a system may be employed that actively monitors whether a vehicle departing a parking space is authorized to do so. Such a system may include the use of a parking sensor that is installed in a parking space. A primary function of such a parking sensor may be to determine if the parking space is occupied. In addition or in alternate, data gathered from the parking sensor may be used to determine if a vehicle has an unauthorized departure from a parking space. For example, a fleet of vehicles maintained by a company may only be used during normal business hours. Therefore, if a vehicle of the fleet departs a parking space at an odd time, such as 3 AM, this behavior may be indicative of a theft. Rather than waiting for an employee to notice the theft, immediate action may be taken to recover the vehicle.

Since such an arrangement relies on a parking space sensor being present, it may not be necessary to have any dedicated hardware on the vehicle. However, in some embodiments, having an on-board vehicle module may be used instead of, or in cooperation with, the parking space sensor. Such an on-board vehicle module may communicate wirelessly with a cloud-based server system that monitors for unauthorized vehicle departures. In some embodiments, the on-vehicle module may communicate with the parking sensor, thus allowing a determination to be made as to which vehicle is parking in which particular parking space.

Figure 1:
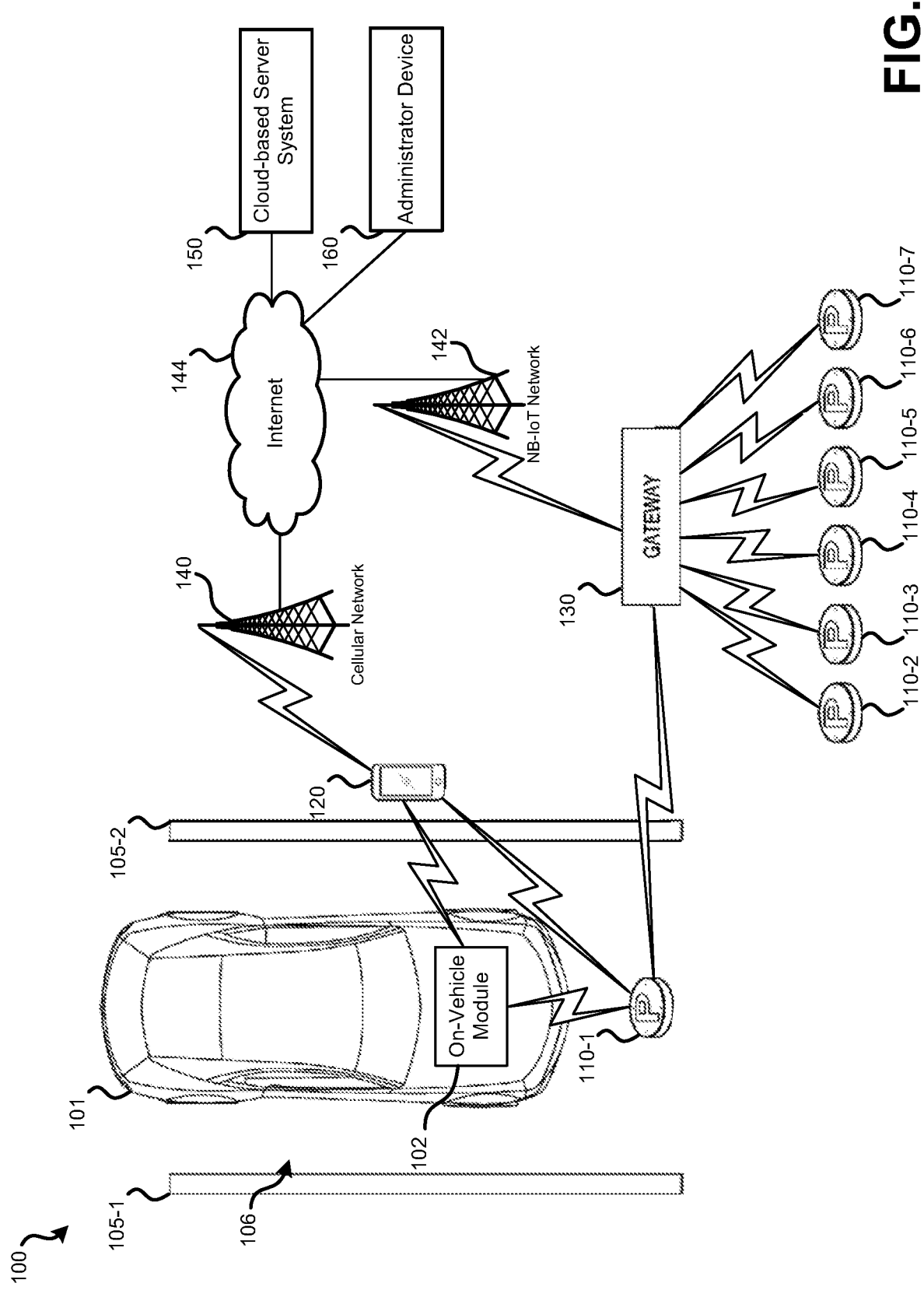
FIG. 1 illustrates an embodiment of a parking sensor system.

Further detail regarding the monitoring of vehicles when parked is provided in relation to the figures. FIG. 1 illustrates an embodiment of a parking sensor system 100. Parking sensor system may include: vehicle 101; on-vehicle module 102; parking sensors 110 (illustrated as parking sensors 110-2, 110-3, 110-4, 110-5, 110-6, and 110-7 in FIG. 1);

mobile communication device 120; gateway 130; cellular network 140 (e.g., 3G, 4G, 5G, or more advanced cellular networks); narrow-band internet of things (NB-IoT) network 142; the Internet 144; cloud-based server system 150; and administrator device 160. It should be understood that in some embodiments, not all components may be present. For example, on-vehicle module 102 may not be used in at least some embodiments.

Vehicle 101 may be a car, truck, motorcycle, scooter, or any other form of vehicle that is typically parked when not in use. Vehicle 101 may be operated by a private owner or by a company as part of a vehicle fleet. Vehicle 101 may park in a defined parking space, such as a parking space 106, which is defined by parking space border lines 105 (105-1 and 105-2). Within parking space 106, in-space parking sensor device 110-1 may be installed. In-space parking sensor device (also referred to as a "parking sensor") 110-1 may, for example, be attached with the ground within parking space 106 such that when a vehicle, such as vehicle 101, parks in parking space 106, vehicle 101 is positioned above parking sensor 110-1. Further detail regarding how parking sensor 110 functions is provided in relation to FIG. 2.

Parking sensor 110-1 may communicate wirelessly with various other components of system 100. Parking sensor 110-1 may communicate with: on-vehicle module 102; communication device 120; and/or gateway 130. Gateway 130 may serve as a local hub that communicates with a plurality of parking sensors (e.g., parking sensors 110). Gateway 130 and parking sensors 110 may use a low-power wireless communication protocol to communicate with each other, such as Bluetooth Low-Entergy® (BLE) or Bluetooth®. Other possible protocols include an IEEE 802.15 protocol; Thread®; Wi-Fi®; an IEEE 802.11 protocol; Zigbee®; or Z-Wave®. Further detail regarding gateway 130 is provided in relation to FIG. 3.

Parking sensor 110-1 may communicate using the same or a different low-power wireless communication protocol with on-vehicle module 102. On-vehicle module 102 may receive power from vehicle 101 (e.g., via the vehicle's electrical system) and may communicate with cloud-based server system 150 either directly via cellular network 140 or by communicating with either communication device 120 or parking sensor 110-1. On-vehicle module 102 may, possibly in response to a request (e.g., from a parking sensor), output: an indication when vehicle 101 has had its transmission set to park; an indication of a vehicle identifier that differentiates vehicle 101 from other vehicles (e.g., other vehicles that are part of the same fleet); an indication of location (e.g., GPS coordinates); and/or a timestamp and date stamp. Such data may be transmitted in response to on-vehicle module 102 communicating with a parking sensor, such as parking sensor 110-1, in response to vehicle 101 being placed in park; or based on the location of vehicle 101.

Communication device 120 may be a smartphone, cellular phone, or some other mobile computerized device that can communicate with cellular network 140. In some embodiments, communication device 120 is used in lieu of on-vehicle module 102 and may perform the same functions of on-vehicle module. In such embodiments, communication device 120 may be typically kept with a usual driver of vehicle 101 and, thus, may tend to be within vehicle 101 when the driver is using vehicle 101. In some embodiments, communication device 120 may provide data to parking sensor 110-1. For example, communication device 120 may transmit a vehicle identifier of vehicle 101 to parking sensor 110-1.

Communication device 120 may communicate with on-vehicle module 102 and/or parking sensors 110 (such as parking sensor 110-1). In some embodiments, data to be transmitted by on-vehicle module 102 to cloud-based server system 150 may be transmitted using a low-power wireless communication protocol to communication device 120 for relay. In some embodiments, parking space identification information (e.g., a parking space identifier that distinguishes parking sensor 110-1 and parking space 106 from other parking sensors and parking spaces) may be transmitted by parking sensor 110-1 to communication device 120. Therefore, if a driver of vehicle 101 is carrying communication device 120, when the driver parks vehicle 101, parking sensor 110-1 can communicate with communication device 120 to provide communication device 120 with information identifying the parking space in which vehicle 101 is parked. This data may be transmitted by communication device 120 to cloud-based server system 150.

Data from parking sensors 110, on-vehicle module 102, and/or communication device 120 may be communicated to cloud-based server system 150 via Internet 144. In some embodiments, Gateway 130 may use cellular network 140 to communicate with cloud-based server system 150 via Internet 144. In other embodiments, Gateway 130 may use NB-IoT network 142 to communicate with cloud-based server system 150. NB-IoT network 142 may allow for a small amount of data to be transmitted over relatively large distances. NB-IoT is classified as a low power wide area network (LPWAN). NB-IoT Network 142 may limit the bandwidth to a single narrow-band of 200 kHz. Data transfer rates may be limited to 10 Mbit/s or slower for downlink communications to devices and 5 Mbit/s or faster for uplink communications from the devices. Further detail regarding cloud-based server system 150 is provided in relation to FIG. 4. In other embodiments, a different type of wireless network may be used.

In some embodiments, neither on-vehicle module 102 or communication device 120 is present. Rather, parking sensor 110-1 is aware that a vehicle has entered parking space 106, but may not be able to identify any details of vehicle 101. However, it may be possible that data about vehicle 101 may be inferred. For example, if parking space 106 is within a restricted parking lot (e.g., a gated lot that can only be accessed by authorized vehicles or users), it may be inferred that vehicle 101 is part of a defined group of vehicles. As another example, vehicle 101 may be assigned to parking space 106. Therefore, when a vehicle parks in parking space 106, it can be inferred that the vehicle is vehicle 101.

Administrator device 160 may communicate with cloud-based server system 150 via Internet 144. Administrator device 160 may also use cellular network 140, NB-IoT network 142, or some other communication network to communicate with cloud-based server system 150. When a vehicle, such as vehicle 101, is determined to have left a parking space, such as parking space 106, during a time period indicative of the vehicle movement being unauthorized, administrator device 160 may be notified by cloud-based server system 150. Administrator device 160 may be a smart phone, cellular phone, computer system, tablet computer, or some other form of computerized device at which it administrator that is responsible for monitoring vehicles is made aware that vehicle 101 has made an unauthorized departure from parking space 106.

Figure 2:
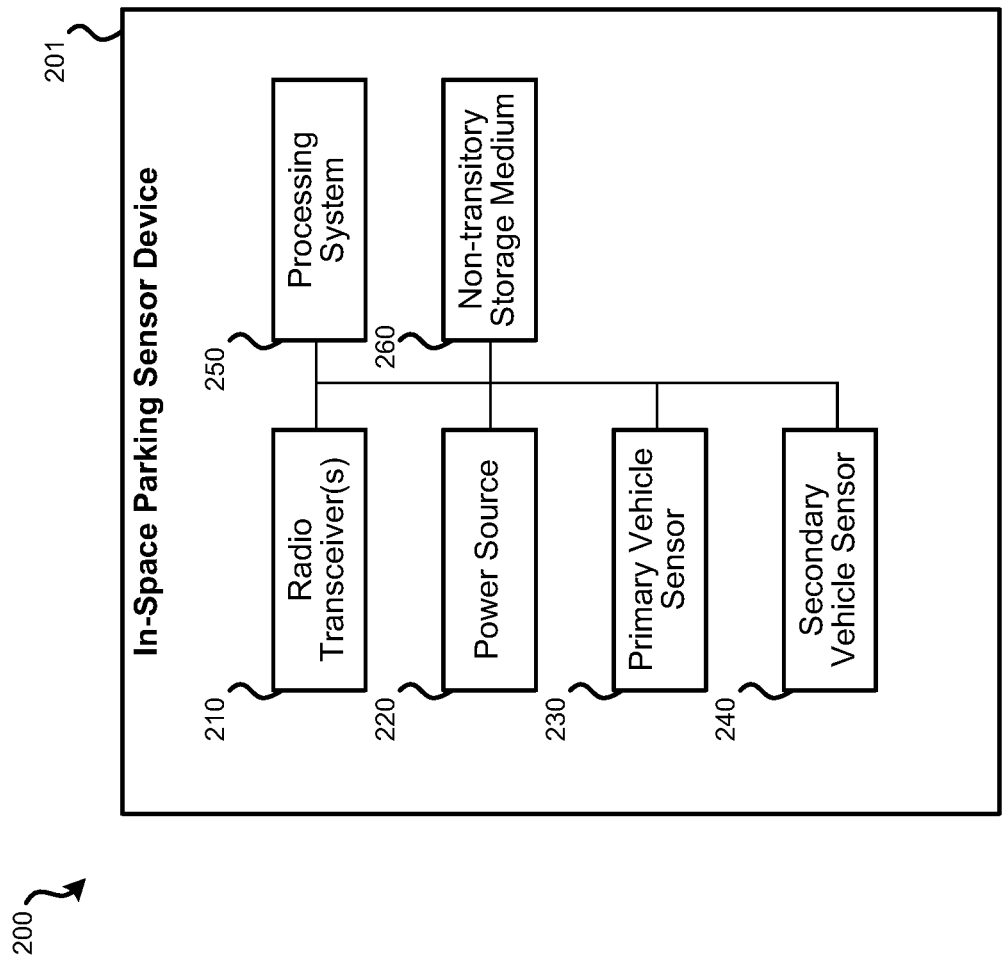
FIG. 2 illustrates a block diagram of an embodiment of a parking sensor.

FIG. 2 illustrates a block diagram of an embodiment of a parking sensor 200. Parking sensor 200 can represent each of parking sensors 110 of FIG. 1. Parking sensor 200 may be designed to be placed within a parking space such that when a vehicle parks within the parking space, the vehicle will likely be positioned above parking sensor 200. Parking sensor 200 may include: housing 201; one or more radio transceivers 210; power source 220; primary vehicle sensor 230; secondary vehicle sensor 240; processing system 250; and non-transitory storage medium 260. Housing 201 may provide a rigid protective housing that protects the components of parking sensor 200.

One or more radio transceivers 210 may permit in-space parking sensor 200 to communicate with: a gateway system, such as gateway 130; an on-vehicle module, such as on-vehicle module 102; and/or a mobile communication device, such as communication device 120. One or more radio transceivers 210 may be configured to communicate using Bluetooth, Bluetooth low energy, Wi-Fi, or any of the other previously detailed communication protocols.

Power source 220 may represent one or more batteries or other form of power source from which in space parking sensor 200 may be powered. In order to maximize the amount of time between power source 220 needing to be replaced or recharged, the amount of power used by other components of parking sensor 200 may be minimized.

Primary vehicle sensor 230 may use a magnetometer to determine whether a vehicle is present in the parking space in which parking sensor 200 is installed. The magnetometer may detect a change in magnetic field induced by a vehicle entering or exiting the parking space in which parking sensor 200 is installed. It may use very little power in order to operate primary vehicle sensor 230.

In some situations, the change in magnetic field may not be conclusive as to whether a vehicle is present or not within the parking space in which parking sensor 200 is installed. In such situations, secondary vehicle sensor 240 may be used. Secondary vehicle sensor 240 may more accurately determine whether a vehicle is present, but may use more power. Therefore, it may be beneficial to use secondary vehicle sensor 240 only when the information obtained from primary vehicle sensor 230 is inconclusive or for use in calibrating primary vehicle sensor 230. Secondary vehicle sensor 240 may include a time of flight sensor that can determine if a vehicle is present based on an amount of time to receive reflected electromagnetic signal. If the reflected electromagnetic signal is not received or is received after a threshold amount of time, it may be determined that the vehicle is not present within the parking space. If the electromagnetic signal is received before the threshold amount of time has elapsed, this reflection may be indicative of an object being located a close distance above parking sensor 200 and thus may be inferred to be a vehicle.

Processing system 250, which may include one or more processors, may receive data from primary vehicle sensor 230 and secondary vehicle sensor 240. Processing system 250 may read and write data to and from non-transitory storage medium 260. Processing system 250 may interface with one or more radio transceivers 210 to communicate with a gateway, communication device, and/or on-vehicle module. Non-transitory storage medium 260 may be used to store an identifier of parking sensor 200, which may also serve as an identifier of a parking space in which parking sensor 200 is installed.

Figure 3:
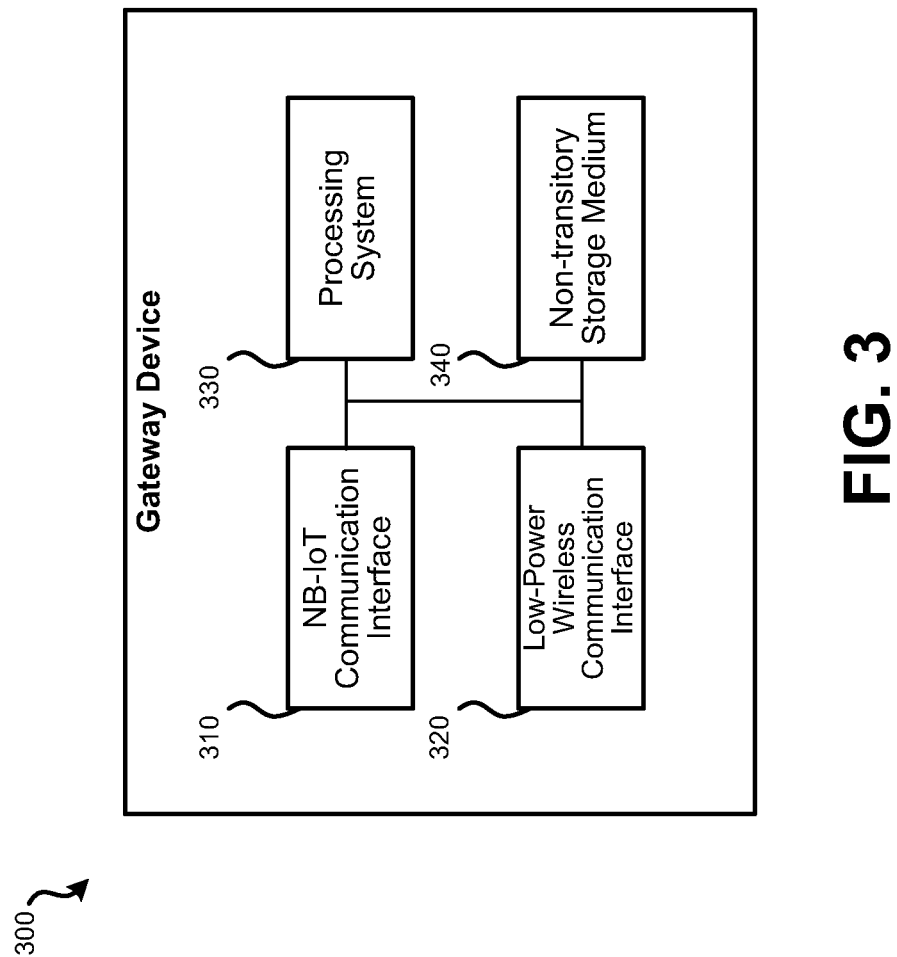
FIG. 3 illustrates a block diagram of an embodiment of a gateway device.

FIG. 3 illustrates a block diagram of an embodiment of a gateway device 300. Gateway device 300 may represent an embodiment of gateway 130 of FIG. 1. Gateway device 300 may serve to: 1) perform local processing of data received from parking sensors 110; and 2) relaying data between cloud-based server system 150 and parking sensors 110. A single gateway device may be used for communication with all parking sensors that are within wireless communication range. Gateway device 300 may use a relatively long distance communication protocol, such as a narrowband IoT communication protocol used by NB-IoT communication interface 310 to communicate with a cloud-based server system. In other embodiments, a wired communication protocol or other wireless communication protocol, such as via a cellular network, may be used for communication between gateway device 300 and a cloud-based server system. In other embodiments, some other form of network may be used for communication.

Low-power wireless communication interface 320, such as BLE or Bluetooth may be used for communication between gateway device 300 and parking sensors. Other possible forms of wireless communication include Wi-Fi or some other IEEE 802.11 or 802.15.4 communication protocol.

Processing system 330 may include one or more processors and may serve to relay and/or perform only some processing on information passed between cloud-based server system and parking sensors via NB-IoT communication interface 310 and low-power wireless communication interface 320. Non-transitory storage medium for 340 may be used to store calibration and/or parking space usage data at gateway device 300.

Figure 4:
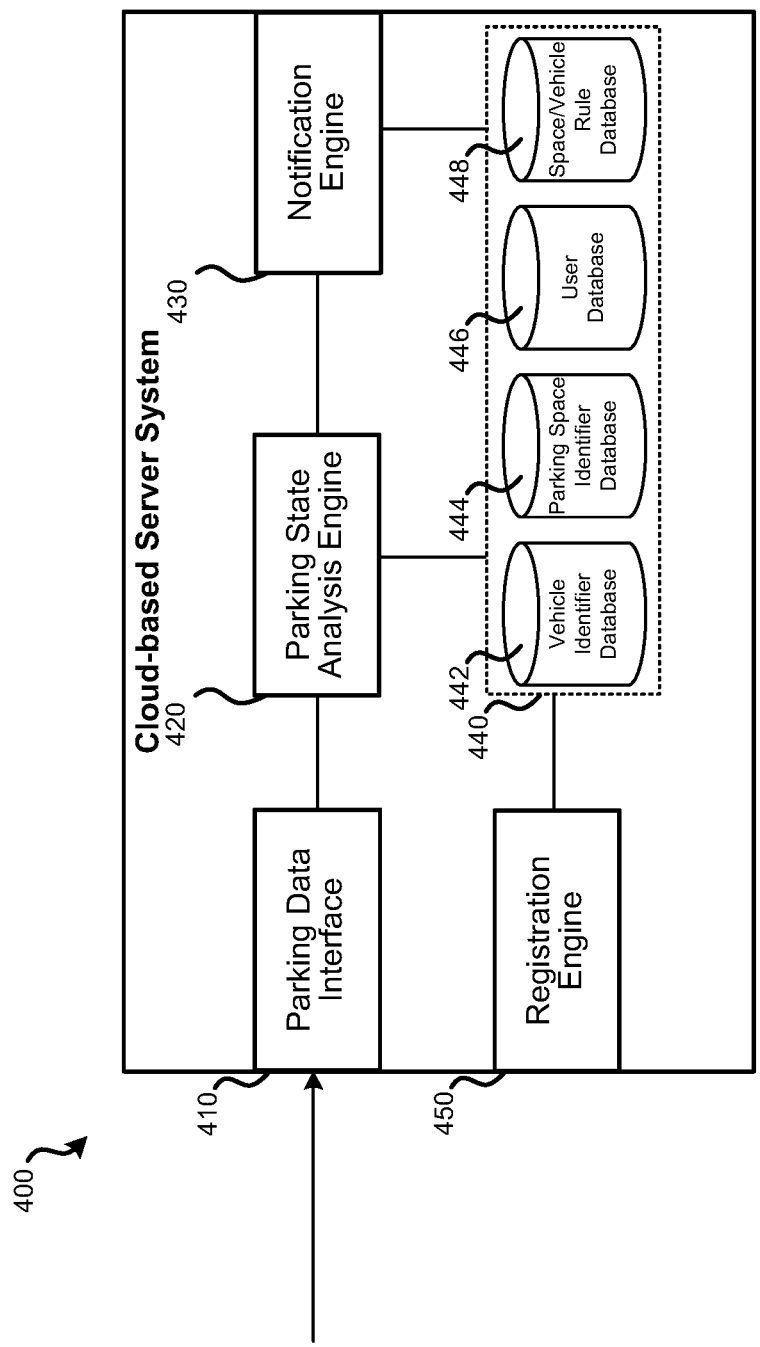
FIG. 4 illustrates a block diagram of an embodiment of a cloud-based server system.

FIG. 4 illustrates a block diagram of an embodiment of a cloud-based server system 400. Cloud-based server system 400 may include: parking data interface 410; parking state analysis engine 420; notification engine 430; databases 440; and registration engine 450. Cloud-based server system 400 may include one or more processors, non-transitory storage mediums, and other computerize components that are used to execute the components of cloud-based server system 400 in the form of software or firmware. In other embodiments, dedicated specialized hardware may be used for each of the components of cloud-based server system 400.

Parking data interface 410 may serve to receive data from parking sensors, gateways, communication devices, and/or on-vehicle modules. The received parking data may be analyzed by parking state analysis engine 420. Parking state analysis engine 420 may determine whether when a vehicle departs a parking space, whether the departure is within a time period during which a departure is at least initially classified as unauthorized. Parking state analysis engine 420 may determine whether a departure is authorized or not based on a time period associated with the particular parking space or with the vehicle which parked in the parking space. Parking state analysis engine 420 may access space/vehicle rule database 448 ("rule database 448"). Rule database 448 may map a time period during which a departure is unauthorized to an identifier of a parking space, parking sensor, or vehicle. Therefore, when parking data for a particular parking space, parking sensor, or vehicle is received by parking data interface 410, parking state analysis engine 420 may determine the current date and time, and use time. Linked with the particular parking space, parking sensor, or vehicle from rule database 448 to determine whether a notification should be transmitted to a user of the vehicle and/or administrator.

Multiple databases may be present within databases 440. Databases 440 may be stored using one or more non-transitory processor-readable mediums. In some embodiments, rather than databases 440 being stored locally by cloud-based server system 400, one or more of databases 440 may be stored using another cloud-based platform that is accessible via a network. Databases 440 may include vehicle identifier database 442; parking space identifier database 444; user database 446; and, as previously described, space/vehicle rule database 448. These various databases may be combined into fewer databases; for example, a single master database may be created using parking sensor identifiers as a key. Vehicle identifier database 442 may be used to map an identifier of an on-vehicle module to a particular vehicle. Additionally or alternatively, vehicle identifier database 442 may map an identifier or user account of a communication device to a particular vehicle. Additionally or alternatively, vehicle identifier database 442 may map a parking space or parking sensor identifier to a particular vehicle (such as if a particular vehicle is expected to park in a particular parking space).

Parking space identifier database 444 may link a parking sensor identifier to a particular parking space. Therefore, data received from a particular parking sensor can be determined to correspond to a particular parking space within a parking lot. Parking space identifier database 444 may store or be linked to a map such that the parking space for which data is received from a parking sensor can be visually represented on the map. User database 446 may store information about users (e.g., drivers) and administrators who are to receive notifications or alarms when a vehicle makes an unauthorized departure from a parking space. An administrator may be linked to a particular vehicle, set of vehicles, parking lot, group of parking spaces, single parking space, or geographical region. A user, such as a driver, may be linked to an individual parking space, parking sensor, or vehicle. A telephone number, email address, or other form of contact information may be stored in user database 446 for each user and administrator. In some embodiments, data is stored that identifies particular user and administrator accounts such that push notifications can be transmitted to the mobile devices of users and administrators. As previously detailed, rule database 448 may link dates, days of the weeks, holidays, and/or time periods during which departures from a parking space are authorized or unauthorized. Rule database 448 may map a parking space to a rule or may directly link a parking sensor, vehicle, on-vehicle module, or communication device to a particular rule.

Registration engine 450 may allow administrators and/or users to log into cloud-based server system 400 and add or change data stored in databases 440. Registration engine 450 may allow parking sensor data, parking space data, user data, and on-vehicle module data to be updated or added.

Figure 5:
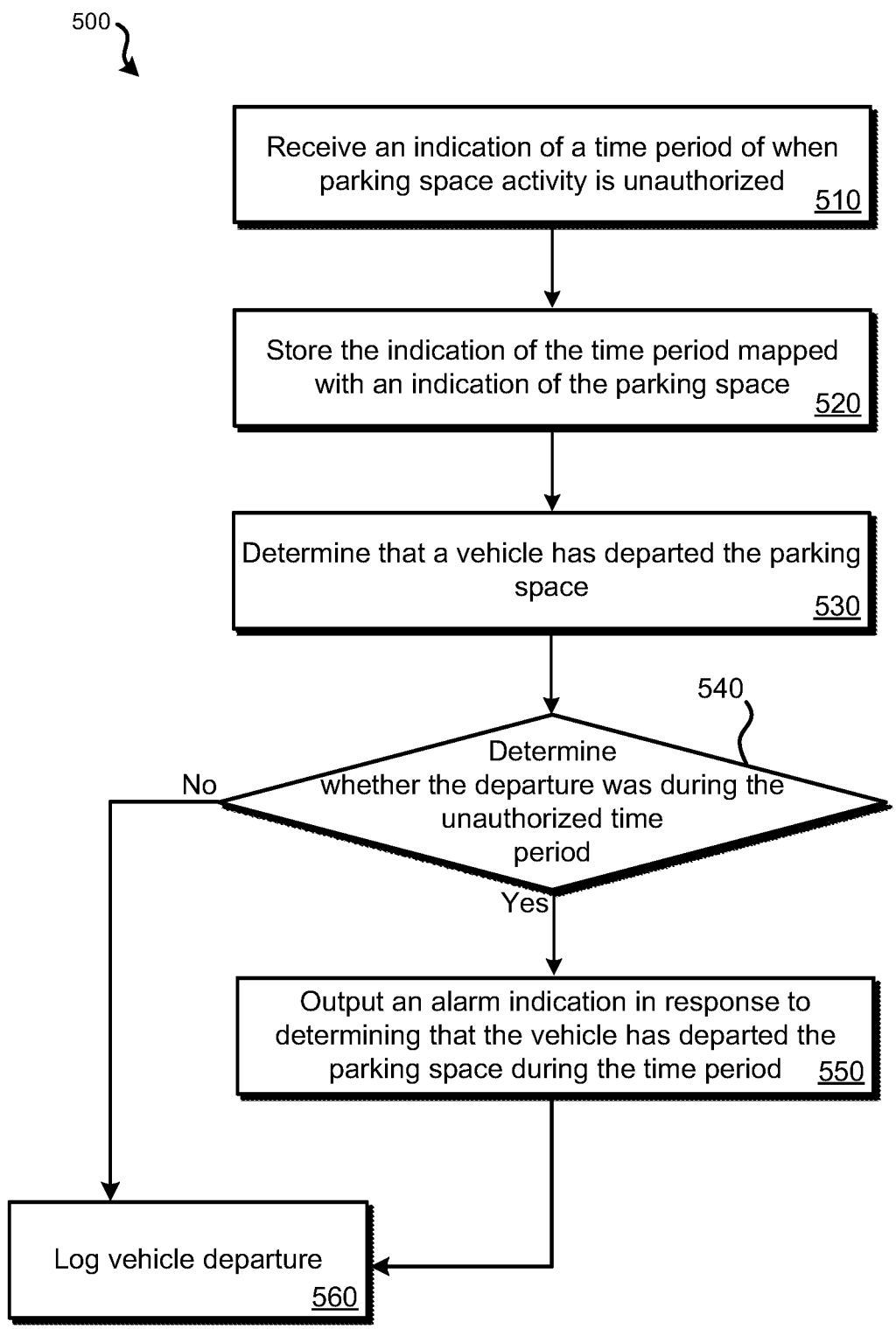
FIG. 5 illustrates an embodiment of a method for monitoring unauthorized use of a vehicle.

Various methods may be performed using the systems and devices detailed in relation to FIGS. 1-4. FIG. 5 illustrates an embodiment of a method 500 for monitoring unauthorized use of a vehicle. Method 500 may be performed using system 100 of FIG. 1. At block 510, an indication of a time period during which a departure from a parking space is unauthorized may be received, such as via registration engine 450 of cloud-based server system 400. In some embodiments, during the time period, an arrival to the parking space may also be unauthorized or, in some embodiments, arrivals may be authorized while only departures may be unauthorized. Such an arrangement may allow a user, such as a driver, to park a vehicle in a parking space, but not take a vehicle from a parking space without authorization. (In some embodiments, the reverse arrangement may be enforced: a vehicle may be taken from a parking space during a period of time, but may not have authorization to drive into and park in the parking space during the period of time.) The time period specified at block 510 may be for a particular parking space (or parking sensor which is fixed within the parking space). In some embodiments, different time periods may be specified for different days of the week or dates. At block 520, the one or more indicated time periods may be stored and mapped to a parking space, parking sensor, vehicle, driver, user, communication device, or on-vehicle module. Such storage may occur, for example, in databases 440 of cloud-based server system 400.

At block 530, a determination may be made by the cloud-based server system or gateway that a vehicle has departed the parking space. The determination of block 530 may include receiving parking data from a parking sensor that is indicative of a vehicle leaving. Parking sensor data may be transmitted by the parking sensor to a gateway and, possibly, to a cloud-based server system. In some embodiments, the parking data is received via a communication device possessed by a driver or user of the vehicle. The determination of block 530 that a vehicle has left during the time period may be made by a cloud-based server system or by a gateway.

At block 540, a determination may be made by the cloud-based server system or gateway as to whether the departure was unauthorized. The determination may include comparing a current time and date to a time period (and days of the week and/or dates) to the time period indicated as being unauthorized for the parking space in databases 440. If the departure is authorized, method 500 may end without a notification or alarm being transmitted. In some embodiments, the departure time, parking space, and/or vehicle may be logged at block 560.

If the departure was not authorized, method 500 may proceed to block 550. At block 550, the cloud-based server system or the gateway (by communicating with the cloud-based server system) may cause an alarm indication to be transmitted to an administrator or user mapped to the parking space having the unauthorized departure. The alarm indication may indicate the time and date of the departure and an identifier of the parking space. An indication of the vehicle that has departed may be provided if available. In some embodiments, a user (e.g., driver) of the vehicle may have a time period during which he can dismiss a notification as being a false alarm using his communication device before an administrator is notified on his device. For instance, a driver may have to take a vehicle at an unusual time for an out-of-the-ordinary project. When the driver receives a notification of the unauthorized departure on his communication device, the driver may indicate that the departure is, in fact, authorized. This arrangement may prevent an administrator from having to become involved in the situation. If the user or driver does not dismiss the notification as being a false positive or a defined period of time elapses, the administrator may be notified.

Figure 6:
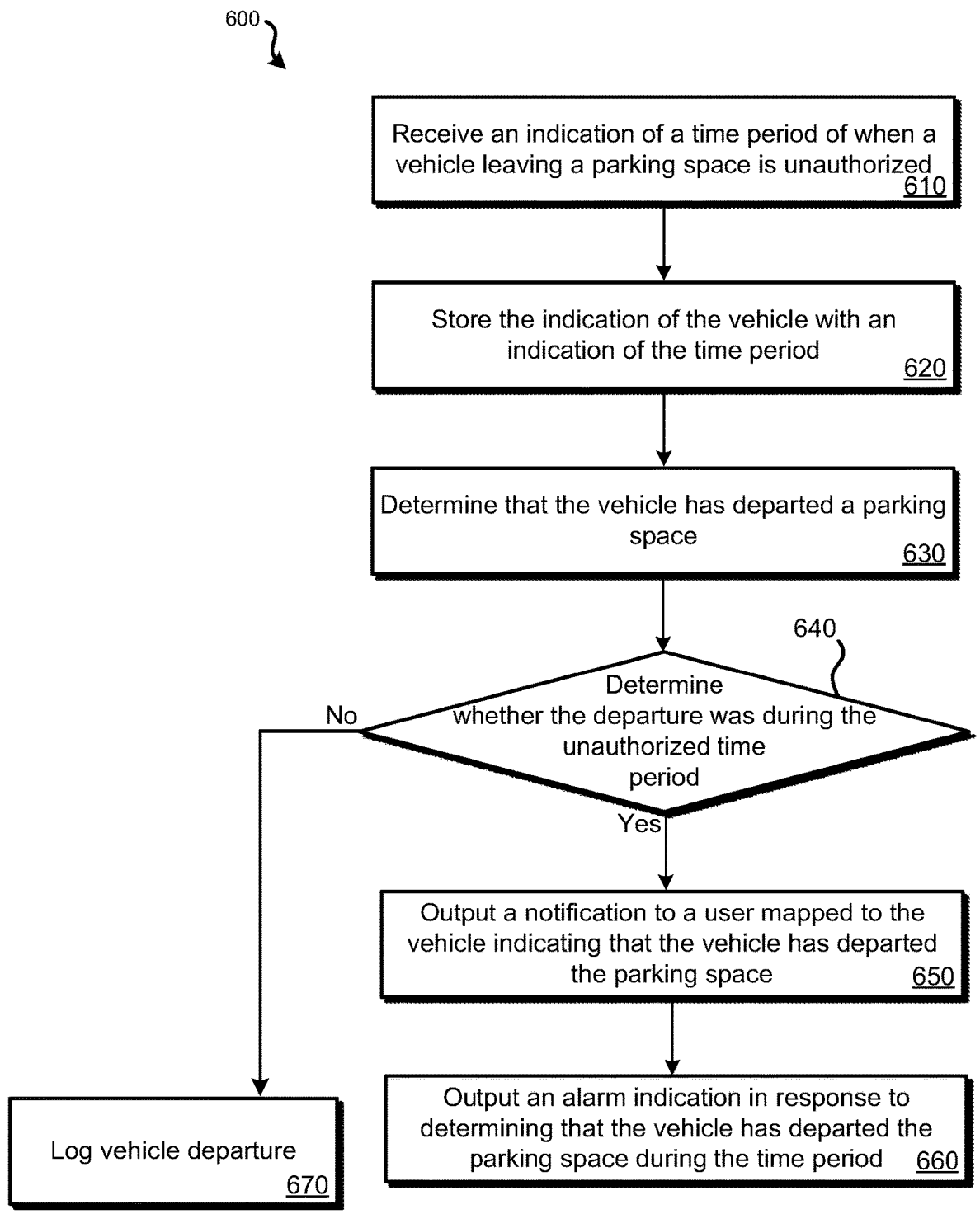
FIG. 6 illustrates another embodiment of a method for monitoring unauthorized use of a vehicle.

FIG. 6 illustrates an embodiment of a method 600 for monitoring unauthorized use of a vehicle. Method 600 may be performed using system 100 of FIG. 1. Whereas method 500 focused on monitoring a particular parking space associated with a parking sensor; method 600 is focused on monitoring a particular vehicle.

At block 610, an indication of a time period during which a particular vehicle departing from a parking space is unauthorized may be received, such as via registration engine 450 of cloud-based server system 400. In some embodiments, during the time period, an arrival of the vehicle to the parking space may also be unauthorized or, in some embodiments, arrivals may be authorized while only departures of the vehicle may be unauthorized. Such an arrangement may allow a user, such as a driver, to park the particular vehicle in a parking space, but not take the vehicle from a parking space without an authorization. (In some embodiments, the reverse arrangement may be enforced: the vehicle may be taken from a parking space during a period of time, but may not have authorization to drive into and park the particular vehicle in the parking space during the period of time.) In some embodiments, different time periods may be specified for different days of the week or dates. At block 620, the one or more indicated time periods may be stored and mapped to the particular vehicle. Such storage may occur, for example, in databases 440 of cloud-based server system 400.

At block 630, a determination may be made that the vehicle has departed the parking space. In some embodiments, at block 630, a parking sensor may send data to a communication device (e.g., smartphone) or on-vehicle module when the vehicle parks in the parking space. This information may include an identifier of the parking space or parking sensor. The communication device or on-vehicle module may then transmit a parking space identifier or parking sensor identifier, the vehicle identifier, and/or a time of arrival at the parking space to a cloud-based server system (e.g., via a cellular network). Accordingly, the cloud-based server system receives data identifying the particular vehicle that parked and the parking space in which the vehicle parked. In other embodiments, the on-board module or the communication device sends a vehicle identifier to the parking sensor. The parking sensor may then transmit an indication of the parking sensor or parking space, along with the vehicle identifier to a cloud-based server system via a gateway. Such data transmission may occur via a NB-IoT network, cellular network, or some other form of communication network.

Alternatively, in some embodiments, at block 630, the parking sensor may transmit data indicating that a vehicle has arrived or departed to the cloud-based server system. Separately, a communication device or on-vehicle module may transmit data (which can include GPS coordinates) to the cloud-based server indicating that the vehicle is moving or has transitioned to/from having its transmission set to park. The cloud-based server system may analyze the received data to determine which parking space or parking sensor is associated with the vehicle. For instance, if a parking sensor determines a vehicle has departed and a vehicle separately reports that its position has changed from a location that approximately matches the parking sensor, it may be determined that the vehicle has left the parking space monitored by the parking sensor.

Alternatively, in some embodiments, at block 630, an on-vehicle module or communication device may report its position and a vehicle identifier when it determines the vehicle has parked (e.g., transmission has been set to park, vehicle has not moved in at least a defined period of time, user provides input saying the vehicle has been parked). In such embodiments, a parking space sensor device may not be used. Rather, the communication device or on-vehicle module provides the vehicle identifier and an indication of when the vehicle has departed from being parked to the cloud-based server system.

At block 640, a determination may be made by the cloud-based server system or gateway as to whether the departure was unauthorized. The determination may include comparing a current time and date to a time period (and days of the week and/or dates) to the time period indicated as being unauthorized for the parking space in databases 440. If the departure is authorized, method 600 may end without a notification or alarm being transmitted. In some embodiments, the departure time, parking space, and/or vehicle may be logged at block 670.

If the departure was not authorized, method 600 may proceed to block 650. At block 650, the cloud-based server system or the gateway (by communicating with the cloud-based server system) may cause a notification to be transmitted to a user, such as a driver, of the vehicle at block 650. The user (e.g., driver) of the vehicle may have a time period during which he can dismiss a notification or provide a response indicative of a false alarm using his communication device before an administrator is notified on his device. For instance, a driver may have to take a vehicle at an unusual time for an out-of-the-ordinary project. When the driver receives a notification of the unauthorized departure on his communication device, the driver may indicate that the departure is, in fact, authorized. This arrangement may prevent an administrator from having to become involved in the situation. If the user or driver does not dismiss the notification as being a false positive or a defined period of time elapses, the administrator may be notified at block 660. An alarm indication may be a text, push notification, or recorded message that may be transmitted to an administrator's communication device or computer system. For instance, an administrator may be presented with an interface identifying the vehicle that has performed the unauthorized departure.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for monitoring use of a vehicle, the system comprising:
   an in-space parking sensor device, comprising:
      a housing configured to be placed in a parking space;
      a radio transceiver housed by the housing,
      a vehicle sensor, housed by the housing, for detecting a presence of the vehicle within the parking space; and
      one or more processors that are in communication with the radio transceiver and the vehicle sensor, wherein the one or more processors are configured to:
         analyze sensor data received from the vehicle sensor; and
         transmit, to a server system via the radio transceiver, parking data indicative of a vehicle departure of the vehicle from the parking space based on the analyzed sensor data; and
   the server system configured to:
      receive an indication of a time period during which a particular vehicle is expected to be parked;
      store the indication of the time period mapped to the particular vehicle;
      receive data indicative that the particular vehicle has parked in the parking space in which the in-space parking sensor device is present;
      receive, from the in-space parking sensor device, the parking data indicative of the vehicle departure from the parking space;
      determine, based on the parking data and the data indicative that the particular vehicle has parked in the parking space, that the particular vehicle departed the parking space during the time period; and
      output a notification based on the particular vehicle having departed the parking space during the time period.

2. The system for monitoring use of the vehicle of claim 1, wherein the data indicative of the vehicle departure comprises a parking sensor device identifier and the server system is further configured to:
   determine the parking space from which the vehicle departure occurred based at least in part on the parking sensor device identifier.

3. The system for monitoring use of the vehicle of claim 1, wherein the server system is further configured to:
   output the notification to a user mapped to the particular vehicle.

4. The system for monitoring use of the vehicle of claim 1, wherein the server system is further configured to:
   output an alarm indication in response to the particular vehicle having departed the parking space during the time period to an administrator.

5. The system for monitoring use of the vehicle of claim 4, wherein the server system is further configured to:
   wait a period of time after outputting the notification to determine if a response is received in response to the notification that indicates a false alarm, wherein the alarm indication is output if no response indicating the false alarm is received.

6. The system for monitoring use of the vehicle of claim 1, further comprising:
   an in-vehicle wireless communication device configured to:
      receive a request from the in-space parking sensor device; and
      in response to the request, transmit a vehicle identifier to the in-space parking sensor device, wherein:
         the indication that the particular vehicle has parked in the parking space in which the in-space parking sensor device is present is transmitted by the in-space parking sensor device.

7. The system for monitoring use of the vehicle of claim 1, further comprising:
   an in-vehicle wireless communication device configured to:
      receive a parking space identifier from the in-space parking sensor device; and
      transmit a vehicle identifier and the parking space identifier to the server system.

8. The system for monitoring use of the vehicle of claim 1, further comprising:
   a communication gateway, comprising:
      a first communication interface that communicates with a plurality of in-space parking sensor devices that comprises the in-space parking sensor device; and
      a second communication interface that communicates with the server system.

9. The system for monitoring use of the vehicle of claim 1, wherein the server system is further configured to:
   output the notification of the vehicle departure to a driver mobile device mapped to the vehicle.

10. The system for monitoring use of the vehicle of claim 1 wherein the vehicle sensor of the in-space parking sensor device is a magnetometer.

11. A method for monitoring use of a vehicle, the method comprising:
   receiving, by a server system, an indication of a time period during which a particular vehicle is expected to be within a parking space;
   storing, by the server system, the indication of the time period mapped to the particular vehicle;
   receiving, by the server system, data indicating that the particular vehicle has parked in the parking space;
   determining, based on data obtained from a parking sensor, that a vehicle departure from the parking space has occurred;
   determining, by the server system, based on the data obtained from the parking sensor and the data indicative that the particular vehicle has parked in the parking space, that the particular vehicle departed the parking space during the time period; and
   outputting, by the server system, a notification based on the particular vehicle having departed the parking space during the time period.

12. The method for monitoring use of the vehicle of claim 11, further comprising:
   determining, by the server system, the parking space from which the vehicle departure occurred based at least in part on a parking sensor device identifier.

13. The method for monitoring use of the vehicle of claim 11, further comprising:
   receiving, by an in-vehicle wireless communication device, a request from an in-space parking sensor device; and
   in response to the request, transmitting, by the in-vehicle wireless communication device, a vehicle identifier to the in-space parking sensor device, wherein the indication that the particular vehicle has parked in the parking space is transmitted by the in-space parking sensor device to the server system.

14. The method for monitoring use of the vehicle of claim 11, wherein the notification is output to a user mapped to the particular vehicle.

15. The method for monitoring use of the vehicle of claim 11, further comprising:
   outputting, by the server system an alarm indication in response to the particular vehicle having departed the parking space during the time period to an administrator.

16. The method for monitoring use of the vehicle of claim 15, further comprising:
   waiting, by the server system, a period of time after outputting the notification to determine if a response is received in response to the notification that indicates a false alarm, wherein the alarm indication is output if no response indicating the false alarm is received.

17. A non-transitory processor-readable medium comprising processor-readable instructions configured to cause one or more processors to:
   receive an indication of a time period during which a particular vehicle is expected to be within a parking space;
   store the indication of the time period mapped to the particular vehicle;
   receive data indicating that the particular vehicle has parked in the parking space in which an in-space parking sensor device is present;
   receive, from the in-space parking sensor device, parking data indicative of a vehicle departure from the parking space;
   determine, based on the parking data and the data indicating that the particular vehicle has parked in the parking space, that the particular vehicle departed the parking space during the time period; and
   output a notification based on the particular vehicle having departed the parking space during the time period.

18. The non-transitory processor-readable medium of claim 17, wherein the notification is transmitted to a driver mobile device mapped to the particular vehicle.

19. The non-transitory processor-readable medium of claim 17, wherein the processor-readable instructions are further configured to cause the one or more processors to:
   output an alarm indication in response to the particular vehicle having departed the parking space during the time period to an administrator.

20. The non-transitory processor-readable medium of claim 19, wherein the processor-readable instructions are further configured to cause the one or more processors to:
   wait a period of time after outputting the notification to determine if a response is received in response to the notification that indicates a false alarm, wherein the alarm indication is output if no response indicating the false alarm is received.

\* \* \* \* \*